Aug. 14, 1951   J. W. BARNES   2,563,811
CAMERA FILM COUNTER
Filed May 26, 1947
2 Sheets-Sheet 1
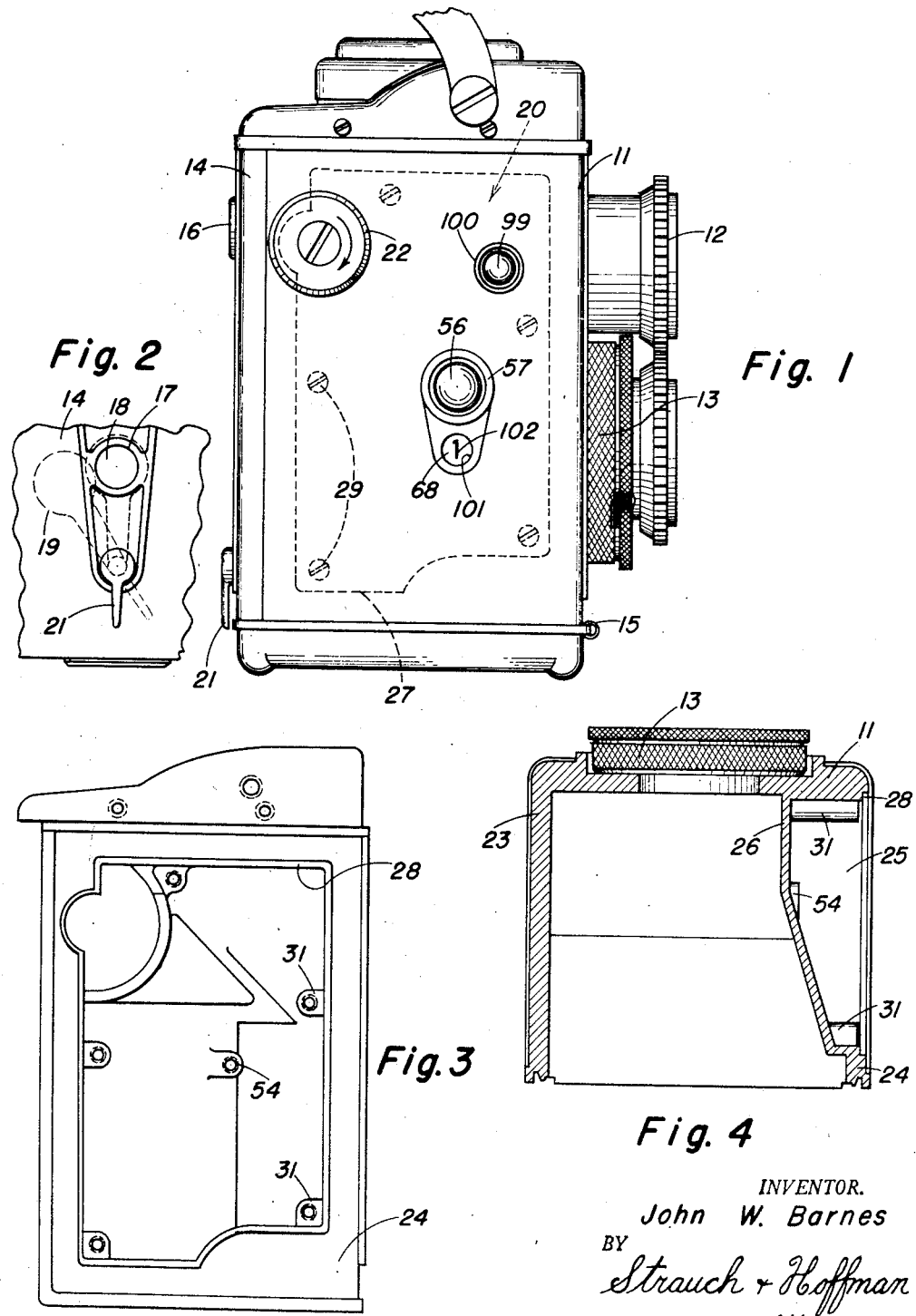
INVENTOR.
John W. Barnes
BY
Strauch + Hoffman
Attorneys Aug. 14, 1951 J. W. BARNES 2,563,811
CAMERA FILM COUNTER
Filed May 26, 1947 2 Sheets-Sheet 2

INVENTOR.
John W. Barnes
BY *Strauch & Hoffman*
Attorneys

Patented Aug. 14, 1951

2,563,811

UNITED STATES PATENT OFFICE 2,563,811

CAMERA FILM COUNTER

John W. Barnes, Ann Arbor, Mich., assignor to Argus Cameras, Inc., Ann Arbor, Mich., a corporation of Michigan Application May 26, 1947, Serial No. 750,401

5 Claims. (Cl. 235—91)

This invention relates to cameras and particularly to exposure counting and indicating mechanism in cameras.

In the ordinary box camera wherein a roll of opaque-backed sensitive film, for example of sizes known in the trade as 116 or 120, is unreeled in progressive stages from a supply spool to a take-up spool, location of the different portions of the sensitized front surface of the film before the exposure aperture is determined by looking through a red or other non-actinic light transmitting window in the back of the camera at numerals printed on the opaque paper backing of the film. This is done when the initial sensitive portion of the film is located before the exposure aperture for the first exposure, and repeated each time thereafter that a fresh unexposed portion of the sensitized film is to be located before the aperture. These cameras usually have no counters or other indicating mechanism so that it is always necessary to open the window at the back of the camera whenever it is desired to accurately advance the film or ascertain what portion of the film is located before the exposure aperture. Since such films are usually not provided with sprocket holes, it is not possible to drive a film counter sprocket therefrom, and friction driven counters have proven unsatisfactory.

It is an object of the present invention to provide in a roll film camera, a novel film counter mechanism which is driven by film advancing mechanism and accurately indicates equilinear advances of the film across the film aperture, and also provides for arresting film feed when the required amount has been advanced, and is settable after the camera has been initially loaded to correlate it with the film position.

It is a further object of the invention to provide a novel film indexing mechanism which is driven by the film advancing mechanism in a camera, and which controls said film advancing mechanism so that equal increments of the film will be advanced across the exposure aperture.

A further object of the invention is to provide a novel film counter mechanism which is driven by the film advancing mechanism in a camera, and which is calibrated to provide equal advance movements of the film past the exposure aperture and compensate for changing roll diameter at the take-up spool.

It is a further object of my invention to provide in a camera, a novel take-up spool assembly and associated film counter mechanism having interrelated controls. Pursuant to said object, said controls may include clutching means in both the take-up mechanism and the counter for permitting resetting and rewinding operations.

It is a further object of the invention to provide, in a counter mechanism for a roll film camera, a novel ratchet and pawl mechanism for indicating and determining equilinear advances of the film.

It is a further object of the invention to provide a novel camera construction wherein a removable film counter mechanism unit is mounted in a chamber within the camera in novel association with the film take-up spool. This is especially applicable to a twin lens reflex camera of the type which will be decribed in the preferred embodiment of the invention.

Further objects of the invention will presently appear as the description proceeds in connection with the appended claims and the annexed drawings, wherein:

Figure 1 is a side elevation of a twin lens reflex camera of the type to which the preferred embodiment of the invention is applied as will be described;

Figure 2 is a fragmentary rear view of the lower end of the back of the camera, illustrating the device for exposing the opaque back of the film at will of the operator when the initial setting is made;

Figure 3 is a side elevation of the camera body of Figure 1 with the counter mechanism removed from the side thereof;

Figure 4 is a top plan view in section through the camera body of Figure 3 illustrating the chamber for receiving the counter assembly;

Figure 5:
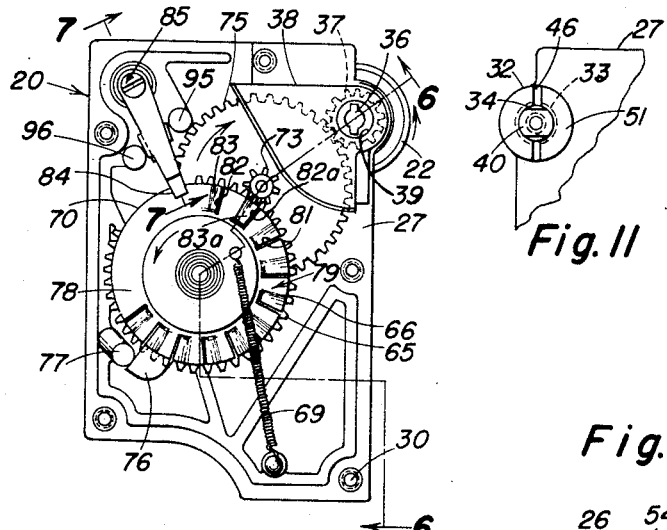
Figure 5 is a side elevation of the removable counter mechanism unit as viewed from the interior of the camera.

In its present preferred embodiment, the invention will be described as a unitary sub-assembly particularly adapted for incorporation into an internal side chamber in a twin lens reflex camera, the sub-assembly comprising, on one mounting plate, a take-up spool drive for the camera and an associated counter mechanism which is actuated by that drive and calibrated to the type of film with which the camera is normally used. It will be understood, however, that this novel sub-assembly may be used in other arrangements for other types of cameras, and is capable of adaptation to substantially any roll film camera, as will be apparent from the scope of the appended claims.

Referring to Figure 1, a camera body 11 has on its front wall a finder lens 12 geared for focusing actuation with a picture taking lens assembly 13, as is usual in twin lens reflex cameras. The bottom and rear walls of the camera comprise a single closure member 14 which is hinged to the lower end of the front wall of the camera body at 15. A closure latch control member 16, which is used to operate a suitable latch interconnection between cover 14 and the top wall of the camera body is provided on the camera back.

As illustrated in Figure 2, the camera back wall is provided with a port 17 in which is mounted a red glass or like non-actinic transparent window 18, and this window is normally closed by a shutter 19 which is pivoted to the interior of the cover and operated by an external handle 21 that is spring-biased toward closed shutter position, but may be temporarily rocked to the dotted line position of Figure 2 to uncover window 18 and enable the operator to view the numerals on the opaque backing of a film extending between a supply spool in the bottom of body 11 and a take-up spool within the upper part of the body coaxial with a manual operating knob 22 (Figure 1) adapted to operate the film advance. Knob 22 is provided with an arrow indicating the proper direction of rotation for advancing the film past the aperture.

As illustrated in Figures 3 and 4, camera body 11 is closed along one side wall 23, but the opposing side wall 24 is apertured to provide a side chamber that extends substantially from top to bottom in the camera. Chamber 25 is closed in light-tight manner at its inner side by an internal wall 26 which is spaced to one side of the light path between taking lens 13 and the film. Chamber 25 is therefore a shallow light-tight recess open to one side of the camera, and it is into this recess that the film take-up drive and counter unit sub-assembly 20 which is preferably carried on a single plate that completes side wall 24 is fitted. This has been accomplished without increasing the lateral dimensions of the usual twin lens reflex camera to which this counter is adapted.

The entire sub-assembly is mounted on a single plate, such as flat plate 27, which is preferably of light metal like the remainder of the camera body, and which is adapted to fit within the internal edge shoulder 28 of chamber 25 so that when the sub-assembly is within the camera, the exterior surface of plate 27 lies flush with the exterior surface of side wall 24, and may be covered by the usual ornamental sheet cover material which hides the heads of the various screws or other fastening means 29 that extend through apertures 30 in plate 27 into body wall bosses such as 31 within the chamber.

Figure 11:
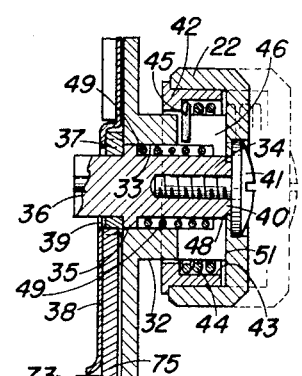
Figure 11 is a side elevation of the counter mounting plate at an upper corner with the take-up knob removed.
Figures 7, 8:
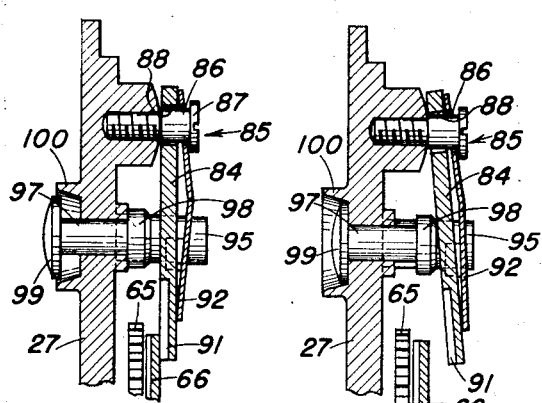
Figure 7 is an enlarged section substantially along line 7—7 of Figure 5, illustrating the release pawl of the counter mechanism when engaged with the ratchet wheel of the counter.
Figure 8 is an enlarged section along line 8—8 of Figure 9 illustrating the parts in the position they appear when the pawl release button is depressed to release the counter ratchet wheel for return to initial position.
Figure 6:
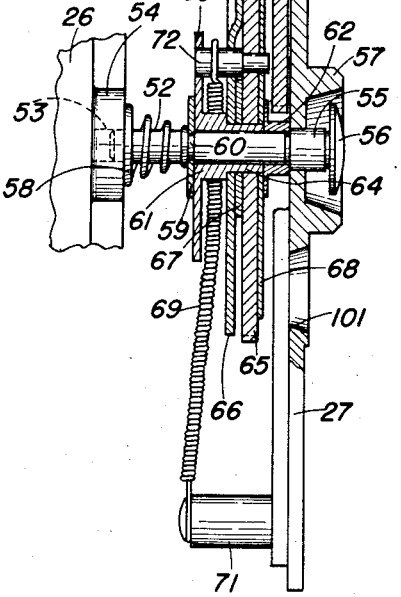
Figure 6 is an enlarged section substantially along line 6—6 of Figure 5, illustrating the take-up spool clutch drive and details of the counter mechanism.

Referring particularly to Figures 5, 6 and 11, plate 27 is formed adjacent an upper corner with an integral hollow boss 32 having a cylindrical bore 33 which serves as a support for a film take-up spool shaft 34 that is rotatably mounted in it. Shaft 34 is formed with a cylindrical intermediate flange 35 which supports it for rotation and axial sliding within bore 33. The inner end 36 of shaft 34, is as illustrated in Figure 5, non-circular of the usual shape to fit into the recessed end of a take-up spool, and is slidably but non-rotatably engaged with a gear 37 that is mounted on it but is held against axial movement by reason of one side of the gear bearing against the flat inner surface of plate 27 and the other side of the gear being engaged by a sheet metal retainer plate 38 apertured at 39 to permit free passage and rotation of part 36 of the shaft.

Shaft 34 is thus mounted for rotation and axial sliding movement within bore 33. During axial movement, it slides with respect to gear 37, but the length of end 36 of the shaft is such that shaft 34 always retains driving engagement with gear 37 regardless of whether it is in its inner position shown in full line in Figure 6, or in its outer de-clutch position, indicated in dotted lines in Figure 6.

Exteriorly of plate 27 and the covering thereof which comprises the side wall of the camera is knurled knob 22 as above described, and knob 22 is non-rotatably secured to the outer end of shaft 34 as by a screw 41 and an aperture in knob 22 fitting non-rotatably with the non-circular terminal 40 of shaft 34, so that shaft 34 is rotated whenever knob 22 is turned. The interior of knob 22 comprises a reversed cup-shaped part 42, which is press-fitted within the periphery of knob 22 and provides an inner cylindrical surface 43 coaxial with shaft 34 enclosing a short coil spring 44. Spring 44 has a free outer end but is formed at its inner end with a radially inwardly extending arm 45 projecting within a narrow diametral slot 46 formed in the outer end of boss 32, whereby the inner end of spring 44 is anchored against rotation.

As illustrated in Figure 6, the outer end of bore 33 is formed with a restricted portion 48 for slidably and rotatably receiving the outer end of shaft 34 and providing an axial abutment stationary with the camera body. A coil spring 49 is compressed between abutment 48 and shaft flange 35 to normally urge shaft 34 axially toward the interior of the camera. When shaft 34 is displaced outwardly as by pulling outwardly on knob 22, spring 49 is further compressed, so that if the knob is merely released, spring 49 will return shaft 34 to the full line position of Figure 6. However, this return may be prevented and shaft 34 retained in its outer position to permit removal of the film spool from the take-up chamber after a roll of film has been exposed and fully wound within the take-up chamber, by rotating knob 22 slightly relative to boss 32 after knob 22 has been pulled outwardly to its limit so as to extract spring arm 45 from slot 46 so that when knob 22 is released spring arm 45 will engage flat boss end face 51 to serve as a stop to prevent inward movement of shaft 34 under urge of spring 49.

With the parts positioned as in full lines in Figure 6, spring 44 is essentially a one-way clutch connection between knob 22 and shaft 34, because when knob 22 is rotated in the direction of the arrow in Figure 1, which is the winding direction of spring 44, the outer periphery of anchored spring 44 simply slips frictionally with respect to surface 43 of the knob, thus permitting rotation of shaft 34. However, when knob 22 is reversely rotated, such tends to uncoil and radially expand spring 44 and the outer periphery of spring 44 engages surface 43 when it expands to immediately frictionally lock knob 22 and shaft 34 against rotation relative to boss 32.

When knob 22 is pulled outwardly to declutch spring 44 from boss 32, part 36 is separated from the film spool in the take-up chamber, so that the film spool may be readily removed from the camera.

Below the take-up shaft assembly above described, plate 27 carries on its interior a counter mechanism driven by rotation of gear 37 when knob 22 is turned in the direction of the arrow.

The counter comprises a cylindrical shaft 52 which is rotatably and slidably supported at its inner end in a suitable cylindrical bearing recess 53 formed in a boss 54 in internal wall 26 of the camera. The outer end of shaft 52 has an enlarged cylindrical portion 55 rotatably and slidably mounted in a suitable aperture in plate 27, and carries a push-button head 56 which, when the shaft 52 is disposed in its outermost position of Figure 6, is protectively enclosed by a circular hood 57 integral with plate 27 so that the danger of accidental operation in minimized. Shaft 52 is resiliently urged toward its outermost position of Figure 6 as by a coil spring 58 between boss 54 and a split washer 59 mounted on a narrow reduced portion 60 of shaft 52.

Between washer 59 and the outer enlarged portion 55 of the shaft, ratchet and gear mechanism for the counter are mounted on shaft 52. This comprises a sleeve 61 rotatably mounted upon shaft 52. A spacer thimble 62 also rotatable with respect to shaft 52 is disposed between the outer end of sleeve 61 and plate 27. At its inner end sleeve 61 is integrally formed with a large diameter flange 63 that abuts against washer 59. Sleeve 61 is also formed with a reduced section 64 on which are pressed a spur gear 65 and a ratchet disc 66 separated by a washer 67 that provides the necessary axial spacing required by the tooth formation of disc 66. The teeth on gear 65 are interrupted for a sector indicated at 70 in Figure 5 for a purpose to be described. Ratchet disc 66 abuts against an inner shoulder of sleeve 61 at the base of section 64, and gear 65 carries a metal dial plate 68 secured to the back of the gear.

Thus, as spring 58 urges shaft 52 to the right in Figure 6, axial outward movement of shaft 52 is arrested by abutment of sleeve 61 and thimble 62, but this does not prevent axial displacement of shaft 52 to the left in Figure 6 as will be described. The gear and ratchet assembly comprising gear 65 and ratchet disc 66, together with sleeve 61, are rotatable as a unit upon shaft 52, and rotation of this assembly is constantly urged in a clockwise direction in Figure 5 by an elongated tension spring 69, which is anchored to a post 71 on the lower end of the inner wall of plate 27, and is secured at its upper end to a fixed pin 72 that projects through flange 63, disc 66 and gear 65 to connect those members for rotation together.

When the parts are in the position illustrated in Figure 6, gear 65 is meshed with a small spur gear 73 mounted for free rotation upon a short spindle 74 projecting inwardly from plate 27. Rigid and coaxial with gear 73 is a larger gear 75 constantly meshed with gear 37 on the end of take-up shaft 34, so that whenever gear 37 is rotated by knob 22, gears 75 and 73 will also be rotated, and when the parts are engaged as in Figure 6, the counter mechanism will be actuated.

The purpose of slidably mounting shaft 52 for axial displacement is to enable the ratchet assembly to be declutched from the drive afforded by take-up shaft 34, this being accomplished by simply pushing in on button 56 to displace shaft 52 inwardly and shift gear 65 axially inwardly until its toothed periphery disengages itself from the toothed periphery of gear 73. When this is done, the entire assembly of sleeve 61, gear 65, disc 66 is free to rotate clockwise about shaft 52 under the influence of spring 69 and will assume the position of Figure 5 where a radial stop 76 projecting from the periphery of disc 66 contacts a stationary abutment 77 projecting from the interior of plate 27 to arrest rotation of the counter assembly.

Figure 12:
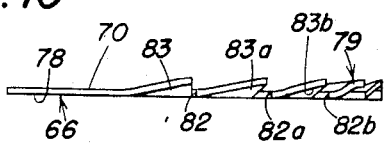
Figure 12 is an enlarged view of the counter ratchet disc illustrating the tooth formation.

Referring to Figures 5, 6 and 12, ratchet disc 66 is formed on its surface opposite gear 65 with a smooth planar axially facing section 78 and a ratchet toothed section 79, the latter being of about twice the angular extent of the former. Disc 66 is an annulus of sheet steel with toothed section 79 being formed by cutting a plurality of spaced deep radial slots 81 in the periphery of the disc and bending the portion of the sheet metal immediately to the left (Figure 5) of each slot inwardly out of the plane of the surface of section 78 and toward gear 65 in Figure 6 so that, as illustrated in Figures 6 and 12, there is provided at the successive slots a series of radial stop faces 82, 82a, 82b, etc., and immediately preceding each slot is formed a series of axially inwardly facing lateral faces 83, 83a, 83b, etc., sloping toward each stop face 82 for permitting coaction of the latter with a pawl end as will be described.

Figures 9, 10, 13:
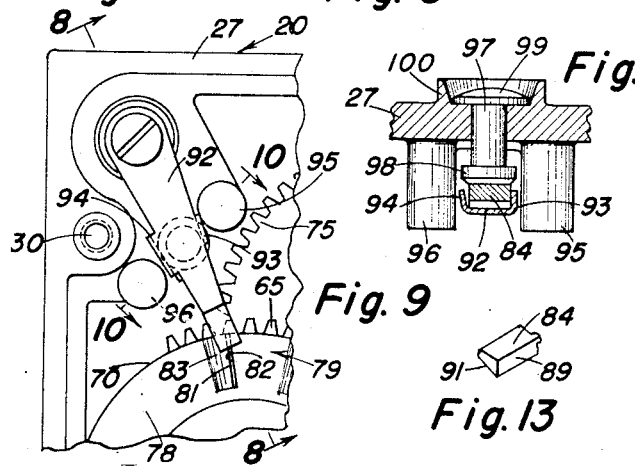
Figure 9 is an enlarged side elevation of the upper corner of the mechanism of Figure 5, illustrating the pawl action.
Figure 10 is a section substantially along line 10—10 of Figure 9, illustrating the relation of the spring and pawl parts.
Figure 13 is a fragmentary perspective end view of the pawl.

A rigid pawl bar 84 is mounted for rocking and rotation on a pivot 85 rigid with plate 27. Pivot 85 comprises a screw having a cylindrical shank 86 and an enlarged head 87 and its axis is parallel to shaft 52. Pawl 84 is formed at one end with an oversized cylindrical bore 88 surrounding shank 86 so as to permit rocking of the pawl in a direction normal to its pivot axis and toward and away from ratchet disc 66. The free end of pawl 84, Figure 13, has a flat side face 89 adapted to contact radial stop faces 82, etc., of the ratchet disc. The undersurface 91 of the pawl is inclined away from face 89 as also illustrated in Figure 13, this permitting the pawl to rock toward disc 66 and dispose face 89 in the path of ratchet stop faces 82, etc., as the disc 66 is rotated.

A bowed leaf spring 92 of resilient strip metal having one end retained about shank 86 is movable with pawl 84, and its free end reacts on pawl 84 to urge it toward the ratchet disc. Spring 92 has an integral tab retainer 93 bent over the side of the pawl (Figure 12) and at the other side opposite face 89 has an integral tab 94 that extends laterally at an acute angle to the plane of the strip. The angular tab 94 serves as a compression spring with an important function in operation of the ratchet as will appear.

Movement of pawl 84 on its pivot axis is limited to a relatively small angle by two spaced abutments 95 and 96 between which the pawl extends. Spring 92 constantly urges the nose of pawl 84 into contact with disc 66. For rocking pawl 84 away from disc 66, I provide in plate 27 a loose slidable plunger 97 having a tip 98 adapted to contact the pawl opposite spring 92. Plunger head 99 is surrounded by a protective collar 100 on the exterior of plate 27.

Below collar 57, plate 27 is formed with a window 101 for viewing the numerals 102 of dial plate 68 as illustrated in Figures 1 and 6.

In operation, the camera is loaded by opening the back, placing a film cartridge in the lower supply spool chamber and pulling the leader strip over the exposure aperture to secure it to the take-up spool which is engaged with the inner end of shaft 34, so that when the back is closed and knob 22 is rotated the film will be advanced over the exposure aperture. Knob 22 is rotated with its one way clutch engaged until, with the shutter 19 at the back of the camera held open, the numeral "1" on the film backing appears before window 18. Whenever the ratchet assembly arrests the film feed during this operation, the user simply presses inwardly on button 99 to release it in a manner described below. At this time, the operator will know that the first sensitized area of the film is positioned before the exposure aperture and shutter 19 is allowed to close. This is the usual procedure in such cameras and shutter 19 must be opened each time a fresh area of film is to be located before the aperture in most prior cameras within my knowledge.

In the present invention, at this point with the initial sensitized area before the aperture, I set in the counter assembly for automatic feed control and indication of the exposure for the remainder of the roll. This is done very simply and speedily in the above embodiment by pressing inwardly on button 56 to thereby momentarily disengage gear 65 from gear 73. During the above described preliminary winding to properly locate the initial sensitive area of the film, gear 65 was rotated (counterclockwise in Figure 5) because of its direct gearing with shaft 34, and this gearing and the one-way clutch action at knob 22 maintained gear 65 in its rotated position when knob 22 was released by the operator. Thus, by the time that the film was properly threaded to locate the first sensitive area at the aperture, the ratchet assembly on sleeve 61 including dial plate 68 had been rotated through a considerable angle which tensioned spring 69 and probably exhibited a dial numeral such as 2 or 3 at window 101. However, when the counter assembly on shaft 52 is released from the check of the take-up spool drive and clutch, spring 69 quickly rotates the assembly until stop 76 engages abutment 77, and in this position the numeral "1" on dial plate 68 is exhibited at window 101. Spring 53 will return shaft 52 and remesh gears 73 and 65 when the button 56 is released. Also, at this time after setting of the counter dial, the free end of pawl 84 is now in frictional contact with the planar section 78 of the ratchet disc in advance of the first slot 81, as illustrated in Figure 5. Also it will be noted that the non-toothed part 70 of the periphery of gear 65 is in advance of gear 73.

By this operation I have automatically correlated the indicator dial 68 to the position of the sensitized film area independently of the leader strip length, and the camera may be used to take the first exposure.

After the first exposure is taken, knob 22 is rotated in the direction of the arrow on it and, through gears 75, 73 and 65, disc 66 is rotated counterclockwise in Figure 5, the flat surface of area 78 slipping beneath the end of pawl 84. As disc 66 continues to rotate, pawl 84 descends the first slope 83 under the force of spring 92 and the pawl side face 89 is engaged by stop face 82. Under the influence of rotating disc 66, pawl 84 first swings through a small angle, clockwise in Figure 5 and, during this movement of pawl 84, spring lever 94 engages abutment 96 and flexes to thereby store up energy in it. After spring lever 94 has become fully energized, at which time it is solidly interposed between abutment 96 and the adjacent side of pawl 84, pawl 84 acts as a stop for ratchet disc 66 and, through the associated gearing, knob 22. Feeling this resistance through knob 22, the operator knows that the second sensitive area is now in place before the exposure aperture without the necessity of opening shutter 19 to view the back of the film. Furthermore the dial plate numeral "2" is now exhibited at window 101.

If desired, instead of integral spring lever 94, a separate coil or other compression spring can be provided between pawl 84 and post 96, with the same operation.

After the second exposure, the film can be further advanced by pushing in on button 99 to rock pawl 84 away from disc 66 to disengage stop faces 89 and 82. As soon as pawl 84 clears disc 66, the compressed spring lever 94 expands, reacting against abutment 96 to move pawl 84 counterclockwise about its pivot axis for a small angular distance sufficient at least to remove face 89 from radial alignment with stop face 82 and so that when button 99 is released and spring 92 forces the pawl end against disc 66, the pawl will not settle back into its previous position with face 89 abutting face 82 but will contact disc 66 with the pawl end bridging the first slot 81 as illustrated in Figure 9. Now knob 22 is free to be rotated to advance the film and this continues until the pawl end descends the second slope 83a and pawl side face 89 engages the second radial stop face 82a, the spring lever 94 again becomes solid, and rotation of disc 66 is again stopped. Now the numeral "3" is exhibited at window 101, and the film is in position for the third exposure.

The operation is repeated for the number of exposures in the film strip each time the film is advanced. In the particular camera illustrated, a film having twelve longitudinally successive exposure areas is provided. Counter plate 68 thus has twelve numerals on it, and disc 66 has eleven stop faces 82, 82a, 82b, etc. adapted to successively engage the pawl. In making disc 66, the slots 81 are each cut with a progressively decreasing (clockwise in Figure 5) angular distance between them, to compensate for the increase in diameter of the take-up film roll as the film is wound. In a working embodiment, the angular distance between successive slots 81 varied between 22° and 19° with a progressively decreasing increment of change.

After the twelfth exposure is made, and pawl 84 is rocked to release disc 66, continued film winding rotation of knob 22 will rotate disc 66 little or not at all because by this time the interrupted section 70 of gear 65 has reached gear 73. Thus winding of the film onto the take-up spool may be completed without further operating the counter.

After the take-up spool winding is completed, the camera back is opened, and knob 22 is pulled out to disengage shaft 34 from the loaded take-up spool which may be removed readily. The camera is now ready for reloading as above described.

If the counter mechanism is left in the position it has assumed when set for the twelfth exposure, the camera can be reloaded and the film advanced to locate numeral "1" on the film at window 18 without the necessity of any intermediate operation of the counter release pawl because rotation of the knob 22 does not rotate disc 66 at this time.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired by United States Letters Patent is:

1. In a film exposure counter mechanism, a rotatable ratchet member having a lateral surface and a series of radial stop faces, a pawl pivoted on an axis parallel to the axis of said ratchet member and rockable toward and from said ratchet member, means for restricting pivotal movement of said pawl, means for resiliently urging said pawl toward said ratchet member, said pawl through said restricting means serving to arrest rotation of said ratchet member when said pawl is engaged by one of said stop faces, resilient means energized by pivotal displacement of the pawl after engagement with one of said stop faces, and means for disengaging said pawl from any one of said stop faces, said energized resilient means acting upon said disengagement to pivotally displace said pawl away from radial alignment with the stop face from which it has just been disengaged.

2. In the mechanism defined in claim 1, a spring biasing said ratchet toward an initial position where said pawl is in engagement with said lateral surface.

3. In the mechanism defined in claim 1, said resilient means for urging the pawl toward the ratchet member comprising a leaf spring, and said energized resilient means comprising an integral extension of said leaf spring.

4. In a film exposure counter mechanism, a rotatable ratchet member having at one peripheral sector a smooth lateral surface and at another peripheral sector a series of radial stop faces angularly disposed with respect to said surface, a pawl pivoted for movement generally parallel to said ratchet member and also being rockably mounted for movement toward and from said ratchet member, resilient means urging said pawl into contact with said ratchet member, whereby when said ratchet member is rotated said pawl will have relative sliding engagement with said lateral surface and is adapted to contact said stop faces, and means for releasing said pawl from contact with one of said stop faces to permit further rotation of said ratchet member.

5. In the mechanism defined in claim 4, a spring urging said ratchet member toward a predetermined initial position and a stop engaged by said member determining said position.

JOHN W. BARNES.

REFERENCES CITED

The following references are of record in the file of this patent:

UNITED STATES PATENTS

| Number | Name | Date |
| --- | --- | --- |
| 666,556 | Prentice | Jan. 22, 1901 |
| 993,047 | Folmer | May 23, 1911 |
| 1,294,433 | Evers | Feb. 18, 1919 |
| 1,439,773 | Veeder | Dec. 26, 1922 |
| 2,046,433 | Slye | July 7, 1936 |
| 2,012,574 | Reason | Dec. 14, 1937 |
| 2,220,599 | Galter | Nov. 5, 1940 |
| 2,229,283 | Fischer | Jan. 21, 1941 |
| 2,233,345 | Hineline | Feb. 25, 1941 |
| 2,245,214 | Milhalyi | June 10, 1941 |
| 2,289,827 | Crumrine | July 14, 1942 |
| 2,358,327 | Harris | Sept. 19, 1944 |
| 2,378,406 | Harris | June 19, 1945 |
| 2,402,149 | Crumrine | June 18, 1946 |

FOREIGN PATENTS

| Number | Country | Date |
| --- | --- | --- |
| 641,181 | Germany | Jan. 22, 1937 |